US012499995B2

(12) United States Patent
Lee et al.

(10) Patent No.: US 12,499,995 B2
(45) Date of Patent: Dec. 16, 2025

(54) AUTONOMOUS MEDICAL RESCUE ROBOTS AND TEAMS

(71) Applicant: Planned Systems International, Inc., Arlington, VA (US)

(72) Inventors: June Lee, North Bethesda, MD (US); Thomas J Berti, Lusby, MD (US); Yan Li, Bethesda, MD (US)

(73) Assignees: Planned Systems International, Inc., Arlington, VA (US); National Society of Medical Scientists, Bethesda, MD (US)

( * ) Notice: Subject to any disclaimer, the term of this patent is extended or adjusted under 35 U.S.C. 154(b) by 541 days.

(21) Appl. No.: 17/894,764

(22) Filed: Aug. 24, 2022

(65) Prior Publication Data

US 2023/0402173 A1 Dec. 14, 2023

Related U.S. Application Data

(63) Continuation-in-part of application No. 17/870,621, filed on Jul. 21, 2022, which is a continuation-in-part of application No. 17/836,264, filed on Jun. 9, 2022, now Pat. No. 12,283,378.

(60) Provisional application No. 63/390,816, filed on Jul. 20, 2022.

(51) Int. Cl.
*G16H 40/67* (2018.01)
*G16H 20/00* (2018.01)

(52) U.S. Cl.
CPC ............ *G16H 40/67* (2018.01); *G16H 20/00* (2018.01)

(58) Field of Classification Search
None
See application file for complete search history.

(56) References Cited

U.S. PATENT DOCUMENTS

| | | | |
|---|---|---|---|
| 2011/0130636 A1* | 6/2011 | Daniel | G08B 21/02 709/201 |
| 2016/0244163 A1* | 8/2016 | Peeters | G06Q 10/083 |
| 2017/0092109 A1* | 3/2017 | Trundle | B60L 53/305 |
| 2019/0008598 A1 | 1/2019 | Frimer et al. | |
| 2019/0262084 A1 | 8/2019 | Roh et al. | |
| 2020/0027560 A1 | 1/2020 | Ling et al. | |
| 2020/0035335 A1 | 1/2020 | Kivatinos et al. | |
| 2020/0098461 A1* | 3/2020 | Macoviak | G06Q 30/018 |

(Continued)

OTHER PUBLICATIONS

Sahashi et al. ("A study of operational liability of the medical rescue robot under disaster," 2011 IEEE/SICE International Symposium on System Integration (SII), Kyoto, Japan, 2011, pp. 1281-1286) (Year: 2011).*

(Continued)

*Primary Examiner* — Christopher B Tokarczyk

(57) ABSTRACT

Systems, methods, and other embodiments relate to automated healthcare for patients in distributed locations. In at least one approach, a method includes receiving patient information, including at least a location of a patient and health information about the patient that is to be treated. The method includes dispatching at least one rescue robot to the location that will treat the patient. The method includes responsive to the at least one rescue robot arriving at the patient, performing, by the at least one rescue robot, therapeutic delivery on the patient according to a treatment plan as identified by the health information.

20 Claims, 9 Drawing Sheets

(56) References Cited

U.S. PATENT DOCUMENTS

| | | |
|---|---|---|
| 2020/0111578 A1 | 4/2020 | Koblick et al. |
| 2020/0338309 A1 | 10/2020 | Kopperschmidt et al. |
| 2021/0327578 A1 | 10/2021 | Buchard et al. |
| 2022/0037039 A1 | 2/2022 | Wein |
| 2022/0047339 A1 | 2/2022 | Prior et al. |

OTHER PUBLICATIONS

Yip et al., "Robot Autonomy for Surgery", World Scientific Review, arXiv preprint arXiv:1707.03080, 2017, 33 pages.

* cited by examiner

AUTONOMOUS MEDICAL RESCUE ROBOTS AND TEAMS

CROSS-REFERENCE TO RELATED APPLICATIONS

This application is a continuation in part of and claims the benefit of U.S. Non-Provisional application Ser. No. 17/870,621, filed on Jul. 21, 2022, which is a continuation in part of and claims the benefit of U.S. Non-Provisional application Ser. No. 17/836,264, filed on Jun. 9, 2022, and claims the priority to U.S. Provisional Application No. 63/390,816 filed on Jul. 20, 2022, which are all herein incorporated by reference in their entirety.

TECHNICAL FIELD

The present disclosure relates, in one aspect, to rescue robots and associated systems and methods to rescue patients and, in particular, the disclosure relates to coordinating the rescue robots to dispatch to a location of a patient and deliver therapeutics in order to treat the patient.

BACKGROUND

Healthcare represents a myriad of complexities for providing quality care. For example, expenses associated with healthcare continue to rise on a yearly basis. Contributors to costs include direct costs of personnel for doctors, nurses, and other caregivers. These costs continue to grow as the availability of caregivers lessens with increased demand. Moreover, further factors that raise costs include insurance premiums, advanced medicine, new medical devices/procedures that require years of investment to develop, and so on. In addition to costs, the accuracy of care is also a difficulty that influences overall quality. As caregivers may be in limited supply, some caregivers may be overextended by working excess hours, thereby potentially increasing the occurrence of errors. Accordingly, providing quality healthcare can encounter various difficulties.

Moreover, robotic systems within the context of healthcare generally have limited utility. This is especially true when considering the role of robots outside of controlled environments, such as hospitals, medical offices, and so on. That is, robotic systems are typically limited to hospitals and other controlled facilities, even though many patients that require care are at least initially outside of such facilities. Moreover, in the context of disasters and emergencies, hazardous environments, such as chemical spills, war zones, fires, and other areas, can be too dangerous for humans to seek out patients and provide. A versatile platform that can travel through rough and unstructured areas is a significant challenge. Accordingly, various difficulties exist in relation to implementing robotic systems within a healthcare context in both structured and unstructured environments.

SUMMARY

Systems, methods, and other embodiments relate to medical rescue robots, including the coordination and dispatching of such robots to provide treatment to patients at locations of the patients. As previously noted, various difficulties exist in relation to providing quality care and also in relation to implementing robotic systems within a healthcare context. The presently disclosed embodiments resolve the noted difficulties by providing teams of medical rescue robots that can dispatch to a location of a patient in the field and provide automated monitoring and care of the patient, thereby improving clinical outcomes for the patient.

For example, in various approaches, a medical rescue robot and/or associated system receives information about a patient, including, for example, health information and location information. In general, the health information may indicate a current condition of the patient, an urgency for providing treatment to the patient, a treatment plan for providing one or more therapeutics to the patient, and so on. The location information indicates, for example, coordinates of the patient in the physical world and may further specify features of the surrounding environment, such as complex terrain, and so on. In one approach, the rescue robot, which is a multifunction robot, self-assembles according to the acquired information. That is, because the rescue robot can be dynamically configured to perform different tasks, the rescue robot, and, in one or more arrangements, additional robots at the direction of the rescue robot, self-assemble according to needs of the particular treatment plan. Thus, the rescue robot inserts appropriate medical tools, including surgical, pharmaceutical, and so on, and may activate other team robots with additional capabilities/modules in order to provide treatment to the patient.

The rescue robots, once assembled, dispatch to the location of the patient. In one arrangement, the rescue robots dock with drones that carry the rescue robots to the location of the patient. In different configurations, the drones may take different forms but are generally envisioned as aerial drones (e.g., unmanned aerial vehicles) that autonomously carry the rescue robots to the location and undock the rescue robots upon reaching the location. The rescue robots then coordinate therapeutic delivery for the patient. In one aspect, one of the rescue robots (i.e., a lead robot) may facilitate the coordination of the therapeutic delivery. That is, depending on the arrangement of each separate rescue robot, the lead robot may initiate the therapy and, for example, mediate communications wirelessly between the robots. In general, the rescue robots function together to perform the therapeutic delivery, including iteratively monitoring/observing the patient during a procedure and adapting the therapeutic delivery as necessary according to feedback. The process of providing the therapy and adapting treatment plan generally involves a machine learning process that is self-evolving to identify when treatment is or is not working and learn how to better treat the patient. In this way, the rescue robots provide healthcare to patients at a location of the patients while adjusting to changes in conditions and knowledge of applying the therapy.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
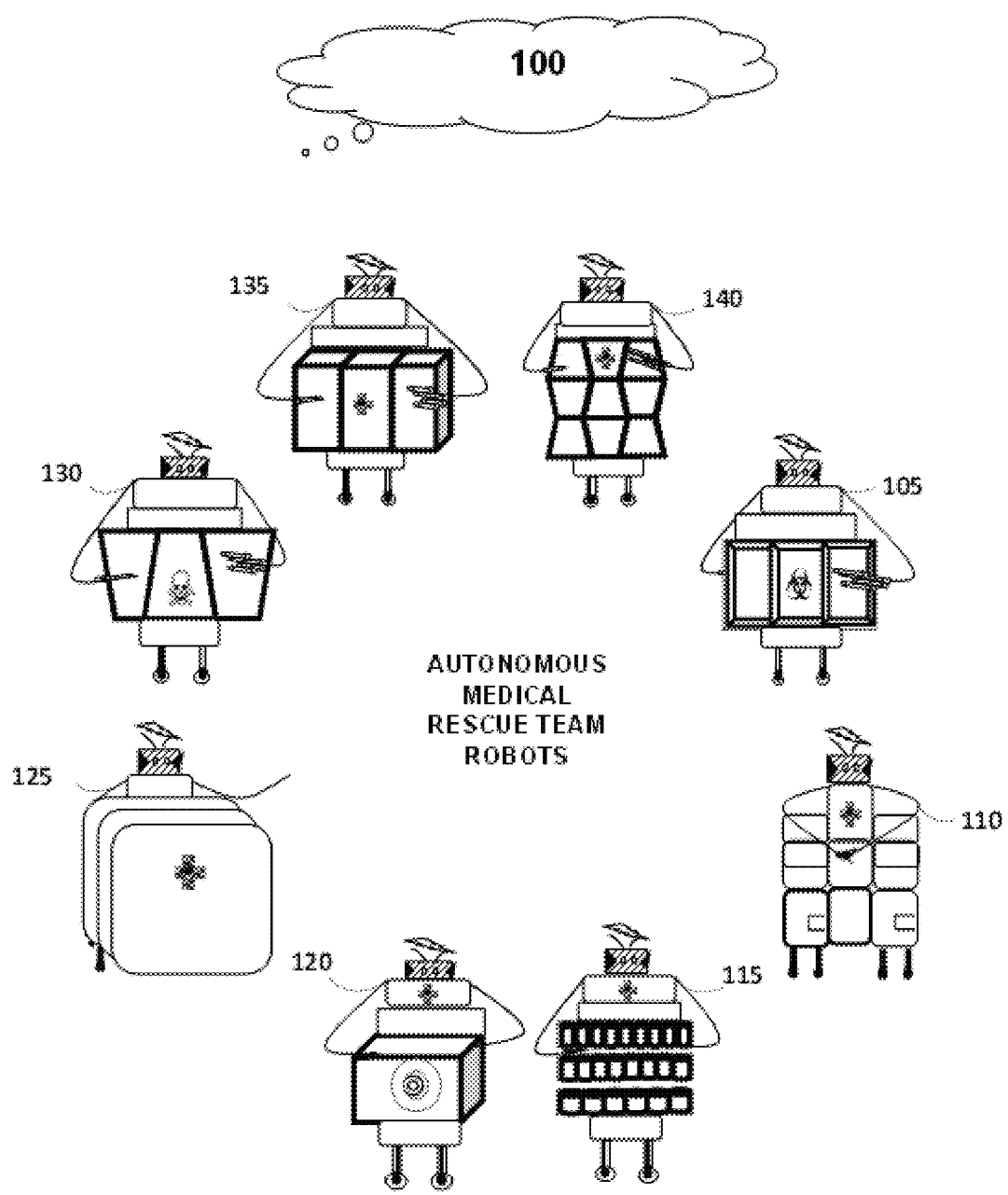
FIG. 1 illustrates one embodiment of rescue team robots and associated systems.

Systems, methods, and other embodiments relate to medical rescue robots, including the coordination and dispatching of such robots to provide treatment to patients at locations of the patients. The presently disclosed embodiments resolve difficulties associated with implementing robotic systems within a healthcare context, and, in particular, within non-controlled environments, such as in the field at a location of a patient. The disclosed arrangements provide teams of medical rescue robots that can dispatch to a location of a patient in the field and provide automated monitoring and care of the patient, thereby improving clinical outcomes for the patient.

For example, in various approaches, a medical rescue robot and/or associated system receives information about a patient, including, for example, health information and location information. In general, the health information may indicate a current condition of the patient, an urgency for providing treatment to the patient, a treatment plan for providing one or more therapeutics to the patient, and so on. The treatment plan may be derived by an online system (e.g., cloud-based) that acquires information about the patient and processes the information to determine how to treat the patient. The location information indicates, for example, coordinates of the patient in the physical world and may further specify features of the surrounding environment, such as complex terrain, and so on. In general, the information may be acquired and provided by various different entities, such as one or more robots present at the location of the patient, first responders, or other people at the location. The information provides insights to the rescue robots about, for example, how to access the patient, what medical devices/supplies may be needed to treat the patient, and so on.

In one approach, the rescue robot, which is a multifunction robot, self-assembles according to the acquired information. Because the rescue robot can be dynamically configured to perform different tasks, the rescue robot, and, in one or more arrangements, additional robots at the direction of the rescue robot, self-assemble according to needs of the particular treatment plan derived from the information initially acquired about the patient. Thus, the rescue robot inserts appropriate medical tools/devices, including surgical, pharmaceutical, and so on, and may also activate other team robots with additional capabilities/modules in order to provide treatment to the patient. It should be appreciated that the referenced rescue robot and the additional robots may form a team of rescue robots, which may include multiple multifunction robots and/or task-specific robots.

The rescue robots, once assembled, dispatch to the location of the patient. In one arrangement, the rescue robots dock with drones that carry the rescue robots to the location of the patient. In various configurations, the drones may take different forms, such as ground-based vehicles, aquatic vehicles, and so on, but are generally envisioned as aerial drones (e.g., unmanned aerial vehicles) that autonomously carry the rescue robots to the location and undock the rescue robots upon reaching the location.

The rescue robots then coordinate therapeutic delivery for the patient. In one aspect, one of the rescue robots (i.e., a lead robot) may facilitate the coordination of the therapeutic delivery. That is, depending on the arrangement of each separate rescue robot, the lead robot may initiate the therapy and, for example, control delivery of the therapy by mediating communications wirelessly between the robots. In general, the rescue robots function together to perform the therapeutic delivery, including iteratively monitoring/observing the patient during a procedure and adapting the therapeutic delivery as necessary according to feedback. The process of providing the therapy and adapting the treatment plan generally involves a machine learning process that is self-evolving to identify when treatment is or is not working and then learn how to better treat the patient. In this way, the rescue robots provide healthcare to patients at a location of the patients while adjusting to changes in conditions and knowledge of applying the therapy.

FIG. 1 illustrates a representative team of rescue robots functioning in cooperation with a cloud-based healthcare system 100. The team of rescue robots includes one or more robots 105, 110, 115, 120, 125, 130, 135, and 140 that can be deployed throughout an autonomous healthcare system. The robots 105-140 may be multifunction robots, as discussed in co-pending application Ser. No. 17/870,621 from which the present application claims priority and which is incorporated herein. Furthermore, the robots 105-140 may function semi-autonomously, and/or fully autonomously to execute the functions described herein. While the robots 105-140 are generally described as multifunction robots, in one or more arrangements, the robots 105-140 may include one or more task-specific robots, which are robots that are at least semi-permanently configured for a particular task. It should be appreciated that even though the robots 105-140 are discussed as functioning in an automated manner (e.g., at least semi-autonomously), the robots 105-140 may acquire information and/or commands from one or more electronic systems, such as the cloud-based healthcare system 100. The cloud-based healthcare system 100 is, in at least one approach, a system for analyzing information about patients and identifying algorithms (e.g., therapies) for treating patients using robots as described in co-pending application Ser. No. 17/836,264 to which the present application claims priority and which is incorporated herein.

In any case, continuing with the robots 105-140, the robots 105-140 may separately include computer processors and/or communications modules to allow the robots 105-140 to interoperate and/or communicate with other systems. Each robot can further include one or more instances of various types of sensors, actuators, storage, power, computer processing, and communication functionality, which can be leveraged and utilized within a robot-to-robot system. Medical sensor sets are capable of detecting, measuring, and generating sensor data describing characteristics of the clinical conditions of patients subject to observation. For instance, a given sensor may be configured to detect one or more respective characteristics, such as movement, weight, physical contact, temperature, wind, noise, light, computer communications, wireless signals, position, humidity, the presence of radiation, liquid, or specific chemical compounds, among other aspects.

As described in the associated application, actuators allow the robot to perform medical procedures and therapeutic delivery. For instance, one or more of the robots 105-140 may include one or more respective actuators that accepts an input and perform its respective action in response. Actuators can include controllers to activate additional functionality, such as an actuator to selectively toggle the power or operation of medical sensor set, an alarm, camera, heating, ventilation, and air conditioning appliance, and lighting, among other examples. Actuators may also be provided that are configured to perform various other functions, such as robot self-assembling, drone lift and landing, and so on.

The autonomous medical rescue team robots can include autonomous healthcare robot 105 communicatively coupled to event responder robot 140 via a communication network. According to multiple embodiments, autonomous healthcare robot 105 can include memory that can store one or more computer and/or machine-readable, writable, and/or executable components and/or instructions that, when executed by a processor, can facilitate performance of operations defined by the executable component(s) and/or instruction(s). In some embodiments, memory can comprise volatile memory (e.g., random access memory (RAM), static RAM (SRAM), dynamic RAM (DRAM), etc.) and/or non-volatile memory (e.g., read-only memory (ROM), programmable ROM (PROM), electrically programmable ROM (EPROM), electrically erasable programmable ROM (EEPROM), etc.) that can employ one or more memory architectures.

Figure 2:
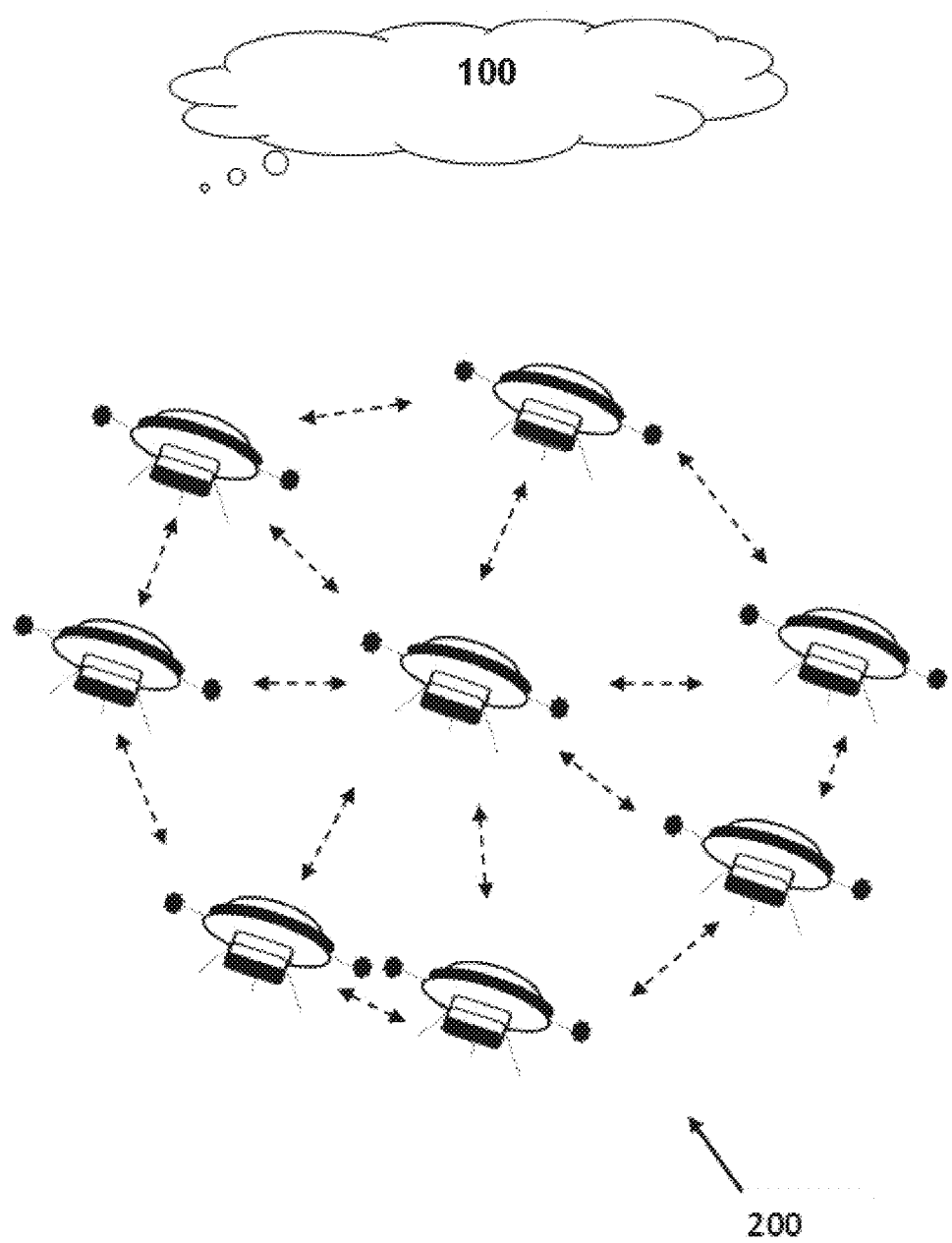
FIG. 2 illustrates one example of drones that transport the rescue robots to a location of a patient.

With reference to FIG. 2, an example group of drones 200 is shown. The drones 200 are examples of devices that may dock with the robots 105-140 and facilitate dispatching the robots to a remote location of a patient. Additionally, the drones 200 can support communication links between multiple geographic locations in an autonomous healthcare network. The drones 200 include robots 105-140 as docked for dispatching to a geographic location, and thus can function to convey communications between the robots 105-140 while further communicating between the drones 200 to further facilitate coordination of movement to the remote location.

Consider the following example to facilitate discussion of the present approach. For example, an event responder robot (i.e., a robot that performs medical diagnostics) can be used by first responders dispatched to a geographic location where a patient is located because of some health-related event. In one or more examples, the event can reference an event that has caused the patient to require treatment, e.g., a heart attack, a car accident, a fall, and so on. In general, the event is any event resulting in the need to treat the patient from a health perspective.

The event can cause the dispatch of first responders, e.g., EMT, police, firefighters, etc. In one or more embodiments, information from the event relating to the patient, the location, and aspects about the event can be collected in order to inform selections of different treatment options that inform the selection of rescue robots and how the rescue robots outfit themselves with different equipment. For example, information about what type of event occurred (e.g., a traumatic event, cardiac, or neurological) can be used to allocate priority to network resources allocated as well as which of interchangeable bellies the system selects and also whether and to where the patient may be transferred. In any case, the first responders, whether human or robotic, collect the initial patient information about the patient and can then electronically communicate the patient information to the cloud-based healthcare system 100. As noted, the patient information can include various different pieces of information relating to the patient. In one arrangement, the patient information includes location information in the form of GPS coordinates, an address, and/or another location identifier. The location information can further specify characteristics of the location, such as current conditions at the location (e.g., wet, dry/accessible, etc.), including the presence of any hazards (e.g., fire, flood, etc.), a type of the location (e.g., building, terrain, urban, rural, etc.), and so on. As a general matter, the location information provides information that facilitates locating the patient and preparing for providing care to the patient at the location.

Additional aspects of the patient information include health-related information, such as general condition, identification of wounds or other injuries, blood pressure, heart rate, temperature, and so on. The health-related information generally includes basic observable health information from the patient, such as the noted vitals and other observations about a general condition of the patient. As an additional aspect, the patient information may include explicit information regarding the urgency/severity of the emergency. For example, even before a first responder arrives at a geographic location, the severity of event 270 can be estimated, e.g., by voice recognition of oral reports and by electronic dispatching data for EMT. Based on this estimated severity, an initial priority level can be assigned to the response to event. In addition, once on scene, a status of patient can be determined (e.g., by monitoring robots such as blood pressure and by the entry of a first responder). The system can use the priority to assign communications supporting the treatment of patients with an adjusted level of priority/quality. Subsequently, a change in the status of the patient can further cause adjustments in the priority.

In additional implementations, the system can adjust various aspects of the response and/or support systems, such as network characteristics of communications. For example, if warranted by analysis of the patient information, the system can elevate network links associated with the treatment of the patient to a higher quality of service (QoS), e.g., by setting a higher QoS class identifier (QCI) and allocation and retention priority (ARP) values for the relevant links. In some circumstances, this approach can increase the efficiency of network resource allocation by considering resource allocations to an incident-level of granularity.

Figure 3:
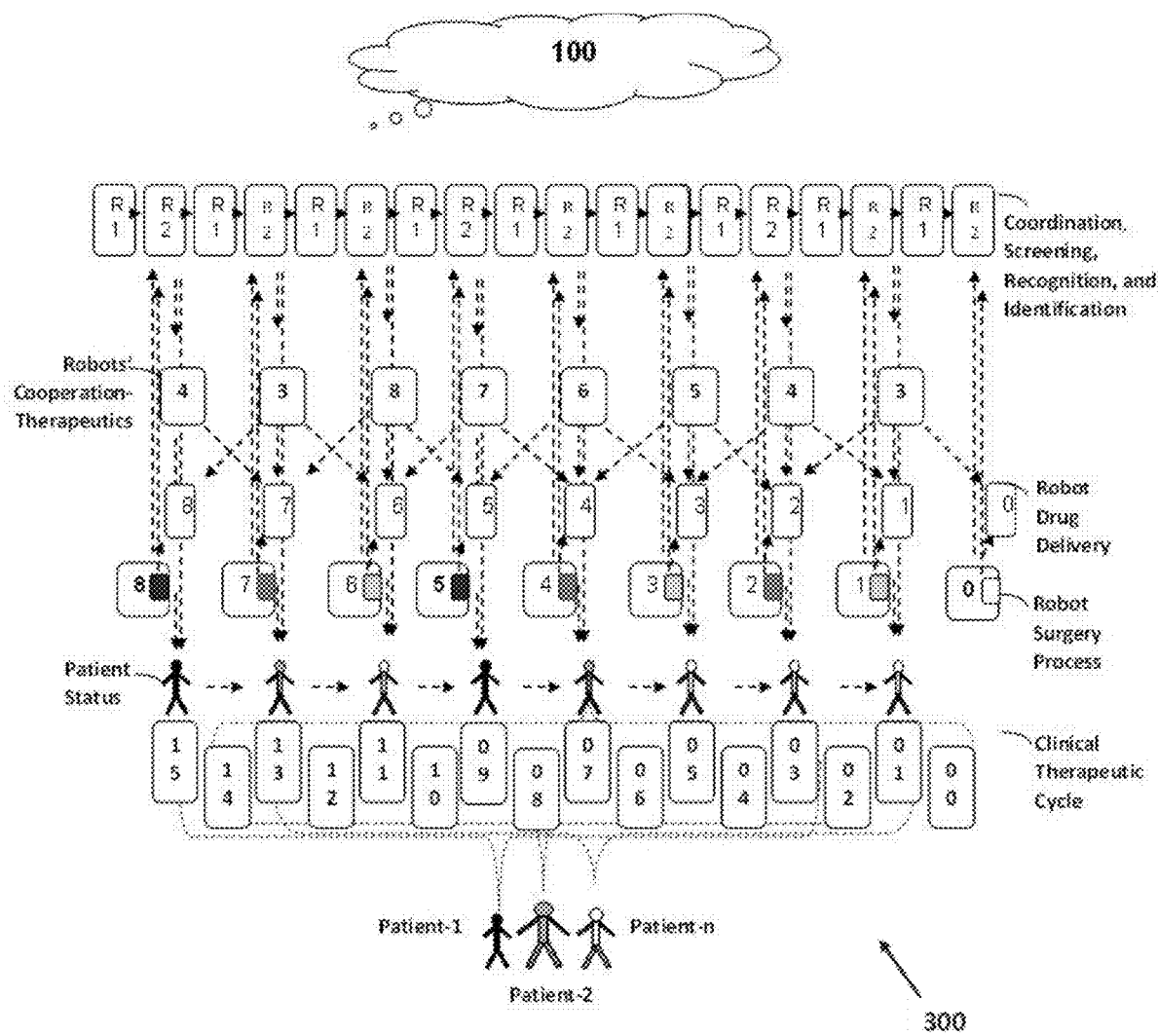
FIG. 3 illustrates a representative embodiment of how a team of rescue robots coordinate to provide care to a patient in a manner that is self-selecting, self-learning, and self-evolving.

FIG. 3 illustrates an architecture 300 of an example system that can facilitate selecting from different interchangeable bellies for a treatment plan, in accordance with one or more embodiments. In one or more embodiments, an event responder robot (e.g., also referred to as a rescue robot herein) can facilitate pre-hospital assessment and treatment of patients. For example, by integrating pre-hospital treatment information about the patient from medical robots that provide vitals and diagnostics, the system, via one or more rescue robots, can facilitate a more accurate assessment of the status of the patient, e.g., including information retrieved from medical records storage. In addition, one or more embodiments can facilitate the selection of a treatment facility based on information about available treatment resources in relation to a condition of the patient.

Additionally, in FIG. 3, continuing the healthcare example from above, using the patient information, which may further include identifying information of the patient, the system can retrieve medical records that may provide insights into the treatment of the patient. In any case, as shown in FIG. 3, the treatment of a patient is shown in relation to various elements. For example, R1, R2 represent coordination, screening, recognition, and identification routines that may be implemented by one or more robots and may further function in relation to the cloud-based healthcare system 100. In one aspect, the robots communicate with the system 100, which performs an initial assessment and diagnosis of a current condition of the patient in order to generate a treatment plan. The treatment plan is, for example, a collection of algorithms to be implemented by the rescue robots in providing care to the patient. That is, the algorithms define one or more therapies and how the robots are to execute the therapies. This information is initially provided to a rescue robot from which the rescue robot determines how to assemble itself and other rescue robots to perform the therapy. Moreover, the rescue robots then dispatch to the patient and begin performing therapies using a feedback and learning system, which is depicted in FIG. 3.

As shown, the robots iteratively perform coordination, screening, recognition, and identification while executing the therapies that can include drug/pharmaceutical delivery, surgery processes, and other medical procedures. This may involve multiple clinical therapeutic cycles of using the algorithms, which the rescue robots iteratively adapt according to feedback regarding the responses of the patient to therapy. Moreover, beyond simply adapting to the feedback, the rescue robots in combination with the system 100, adapt the algorithms through a learning process by logging the acquired information and adapting an overall understanding of the treatment in relation to the response and historical outcomes for patients with similar conditions. This information is leveraged against a history of patients (e.g., 1, 2 . . . n) in order to improve the overall treatment in real-time and subsequently for future patients. In this way, the rescue robots operate in a feedback loop to adapt treatment and learn from the responses of the patient.

Figure 4:
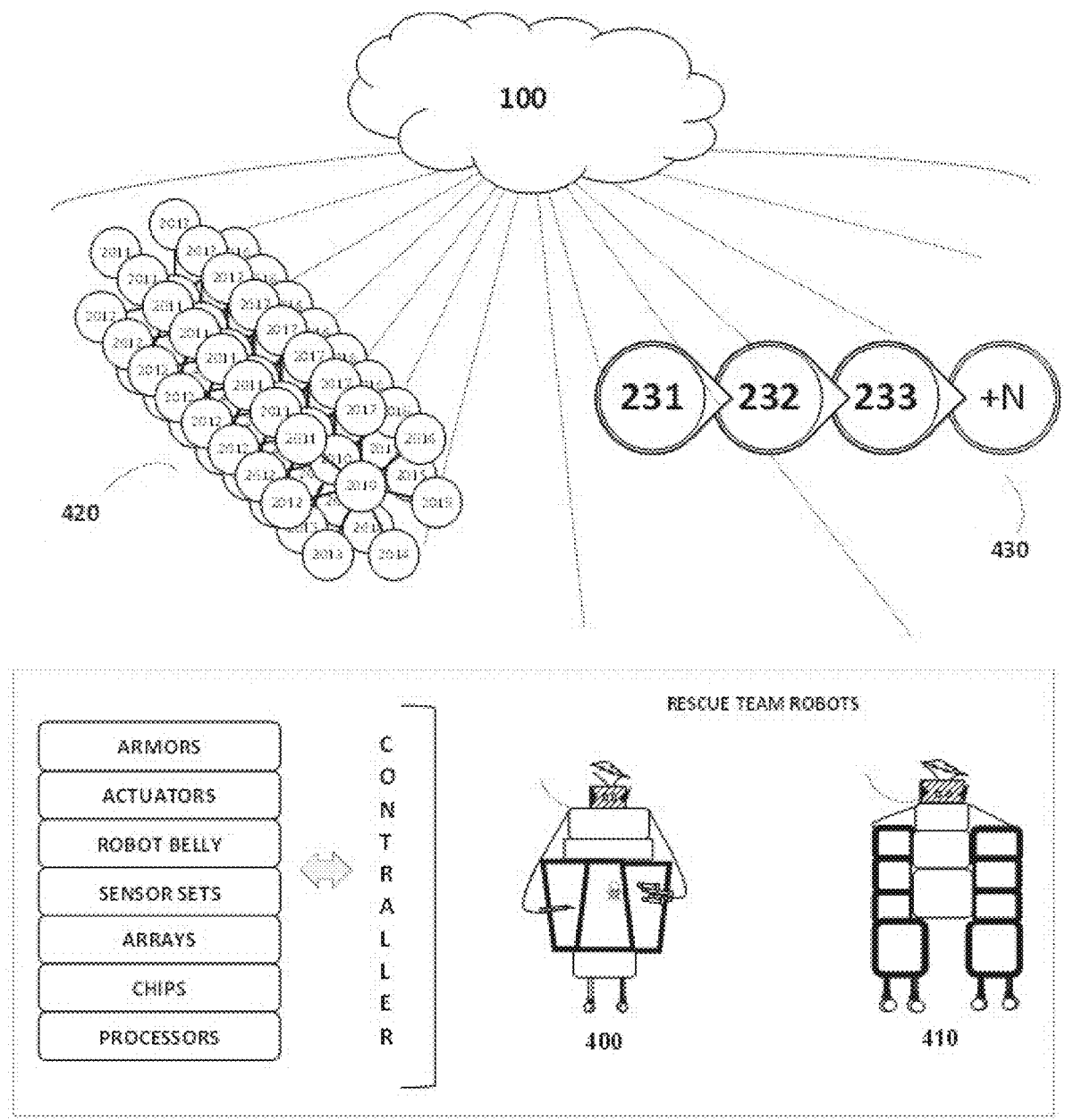
FIG. 4. illustrates one embodiment of rescue robot selection assembling.

FIG. 4. illustrates a team of rescue robots 400 and 410. In one or more embodiments, a rescue robot can evaluate different criteria (e.g., from the patient information, event data, available resources, etc.) and select from different treatment options for the patient (e.g., from available interchangeable bellies) when performing self-assembly. As further noted above, different determinations can be based on the evaluation of current conditions, e.g., a changing patient status. Similarly, treatment resource availabilities can be determined by the rescue robot to be potentially significant for the treatment of the patient. As such, current assessments about the availability of resources can be utilized when selecting from interchangeable bellies. FIG. 4 also illustrates general components of the robots 400 and 410 that may interact with an onboard controller to execute capabilities associated with a particular configuration.

FIG. 4 further represents medical algorithm set selection 420. The healthcare system 100 implements one or more models (e.g., treatment model, monitoring model, etc.) to choose an algorithm for treatment/monitoring according to, for example, a current status/condition of the patient. While one algorithm may perform well in some patients, the same algorithm may perform poorly in others. Thus, the healthcare system 100 functions to identify when to use which algorithm according to acquired information about the patient, thereby optimizing implemented algorithms for separate scenarios and improving overall clinical outcomes. These algorithms are then communicated to the rescue robots, which influences how the rescue robots select available resources.

As further illustrated, FIG. 4 represents robot team selection 430. Accordingly, in various arrangements, the robot system implements one or more functions (e.g., a machine learning model, a heuristic-based function, etc.) to choose a medical robot or robot team from a multifunction robot or swarm of robots when selecting monitoring and treatment algorithms for a patient. The selected robots/teams function to implement Autonomous Therapeutic Procedures (ATP) defined by the algorithms for treating a diagnosed condition of the patient. ATPs encompass a variety of procedures, ranging from the administration of prescription drugs (drug delivery) to surgical procedures to psychotherapy.

Figure 5:
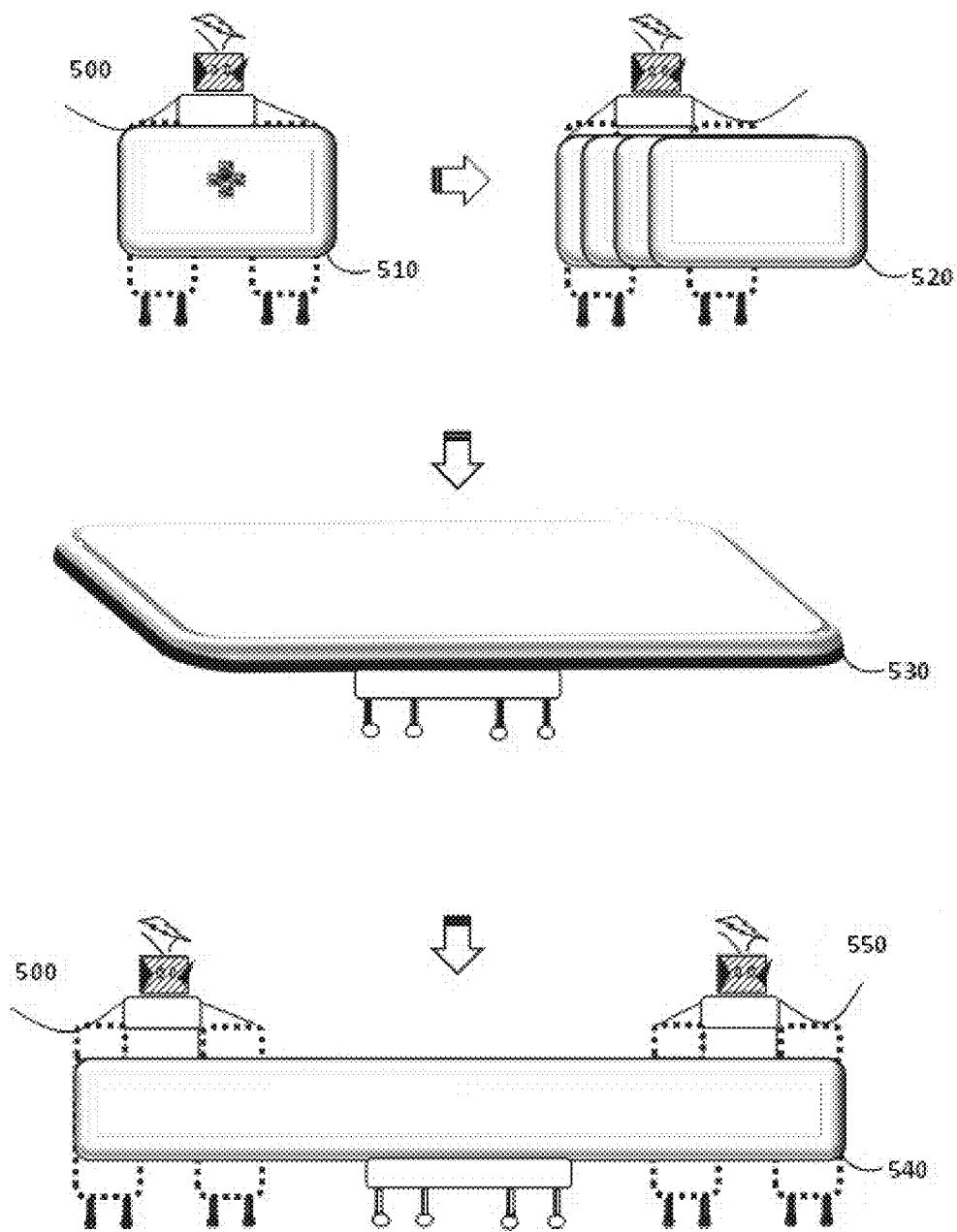
FIG. 5 is a diagram illustrating one configuration of a rescue robot.

Turning to FIG. 5, one example of a particular implementation of a rescue robot 500 is shown in different stages of deployment. In particular, the rescue robot 500 provides a table for treating a patient that includes an integrated suite of sensors. As shown, the rescue robot 500 activates the table via stages 510, 520, 530, and 540. The stage 510 is an initial stowed stage in which the table is stored for transport. The stage 520 is an initial deployment of the table, whereas stages 530 and 540 show completion. At 540, an additional robot may be employed to help support the table. In any case, the rescue robot 500 may function to carry and deploy the table while also functioning in a lead capacity to allocate functions for the treatment plan to other robots and conscript the other rescue robots into the rescue robot team prior to being dispatched.

Figure 6:
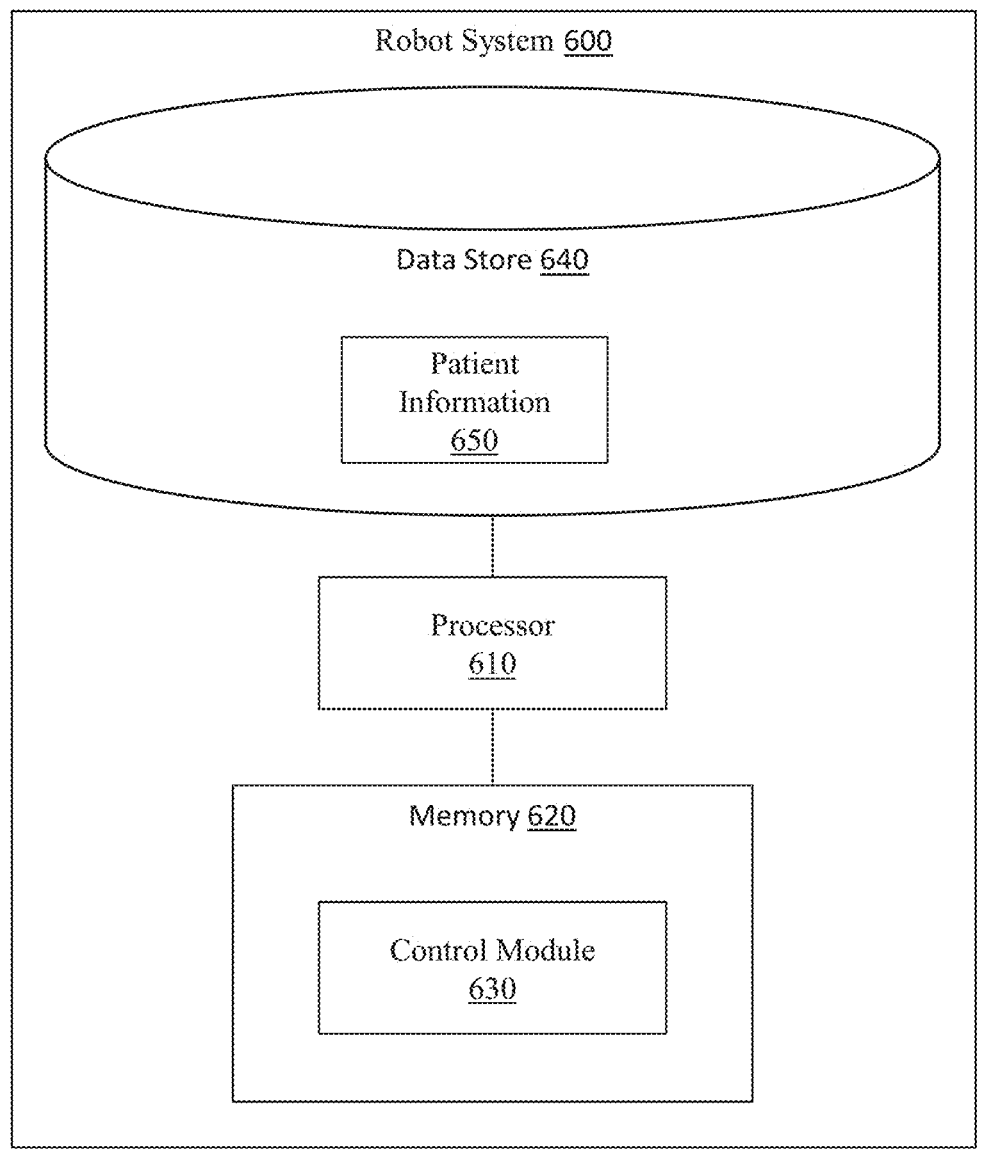
FIG. 6 illustrates one embodiment of a robot system associated with controlling a rescue robot.

With reference to FIG. 6, one embodiment of a robot system 600 is further illustrated. The robot system 600 is shown as including a processor 610. Accordingly, the processor 610 may be a part of the robot system 600 or the robot system 600 may access the processor 610 through a data bus or another communication path as a shared resource (e.g., a distributed processing environment). Thus, the processor 610 may communicate with the robot system 600 through a communication network or may be co-located with the robot system 600. In further aspects, the robot system 600 may include various controllers in addition to the processor 610 that control various subassemblies of a rescue robot. In one embodiment, the robot system 600 includes a memory 620 that stores a control module 630. The memory 620 is a random-access memory (RAM), read-only memory (ROM), a hard-disk drive, a flash memory, or another suitable memory (either volatile or non-volatile) for storing the control module 630 and/or other information used by the robot system 600. The control module 630 is, for example, computer-readable instructions within the physical memory 620 that, when executed by the processor 610, cause the processor 610 to perform the various functions disclosed herein. Moreover, the robot system 600 is generally embedded within the multifunction robot to provide various controls and decision-making processes therein. As such, the robot system 600 may be operatively connected with a communication bus within the rescue robot to facilitate various functions described herein.

Continuing with FIG. 6 and a general embodiment of the robot system 600, in one or more arrangements, the robot system 600 includes a data store 640. The data store 640 is, in one embodiment, an electronic data structure (e.g., a database) stored in the memory 620 or another electronic memory and that is configured with routines that can be executed by the processor 610 for analyzing stored data, providing stored data, organizing stored data, and so on. Thus, in one embodiment, the data store 640 stores data used by the module 630 in executing various functions. In one embodiment, the data store 640 includes patient information 650. As previously described, the patient information 650 can include various different portions of information about the patient (i.e., health information), a location of the patient, and information about providing treatment to the patient. Thus, as a brief example, the patient information 650 includes health-related information, a treatment plan, location information, urgency information, and so on.

The patient information 650 includes at least information that the control module 630 can use to identify which task modules (i.e., interchangeable belly modules) are needed for the treatment plan. Thus, by way of example, the patient information 650, in a simplest form, may include a treatment plan and a location of the patient. The treatment plan outlines therapies (e.g., pharmaceutical, surgical, etc.) that are to be provided to a patient along with, for example, any specific monitoring/screening of the patient that is to be undertaken. In a further aspect, the treatment plan includes specific therapeutic algorithms or at least identifiers of algorithms selected by a cloud-based resource (e.g., the cloud-based healthcare system 100) for performing one or more therapies on the patient. Even still, the patient information 650 can include a location of the patient, an environment of the patient, and other contextual indicators that inform the selection of task modules for carrying out the treatment plan.

To acquire the patient information 650, the robot system 600 may include, or at least functions in cooperation with, a communication system. In one embodiment, the communication system communicates according to one or more communication standards. For example, the communication system may be wired, wireless, or a combination thereof. The communication system can include multiple different antennas/transceivers and/or other hardware elements for communicating at different frequencies and according to respective protocols, whether wired or wireless. The communication system, in one arrangement, communicates via a communication protocol, such as a WiFi, DSRC, V2I, V2V, or another suitable protocol for communicating between the robot system 600 and the respective robots. Moreover, the communication system, in one arrangement, further communicates according to a protocol, such as the global system for mobile communication (GSM), Enhanced Data Rates for GSM Evolution (EDGE), Long-Term Evolution (LTE), 5G, or another communication technology that provides for the robot system 600 communicating with various other systems and/or other robots (e.g., other rescue robots in a team). In any case, the robot system 600 can leverage various communication technologies to provide communications to other entities and/or receive information from other entities, such as the patient information 650. In further aspects, the patient information 650 includes information about available resources, such as available supplies for treatment, different task modules that are currently available, current actions of other robots, and so on.

In any case, the control module 630 includes instructions that function to control the processor 610 to perform various functions in support of autonomously configuring/assembling the robot. Briefly, the control module 630 includes instructions to analyze the patient information 650 in order to identify task modules (also referred to herein as interchangeable bellies) from available modules and which modules for the treatment plan are appropriate for the location of the patient. As outlined previously, the task modules are modular components that can be connected and integrated into the rescue robot in order to impart additional functionality. The task modules include a wide array of different configurations. For example, the task modules include different arrangements of sensors, such as medical imaging sensors, biometric monitoring sensors (e.g., EKG, blood pressure, etc.), pharmaceutical delivery mechanisms, surgical procedure tools, patient support and carrying devices, and so on. In general, the task modules include different arrangements of components for performing an automated function that may be performed by an emergency responder, a nurse, a doctor, and so on in relation to providing treatment to the patient. As an additional note, as used herein, the term "automated" is intended to encompass a spectrum of autonomy, including semi-autonomous and autonomous functionality. Thus, the rescue robots, as described herein, perform the noted functions in an automated manner, which may involve, in one or more configurations, inputs from a user that influence actions of the robot. As still a further aspect, the robot system 600 represents a single instance within a single rescue robot of the team. In various approaches, the robots of the team include separate instances of the robot system 600 with, for example, one of the instances providing a lead or coordinating role to coordinate functions of the team.

Moreover, it should be appreciated that the different combinations of the task modules may provide greater functionality together than individually. That is, a single task, in one or more arrangements may use multiple different task modules. Moreover, a single task module may, in some instances, be shared among multiple different tasks. Therefore, the control module 230 identifies the task modules associated with separate tasks and further determines a module layout within the rescue robot and among any additional rescue robots within a team that may be needed in order to achieve performance of individual tasks and multiple separate tasks defined by the treatment plan and/or in relation to performing tasks at the location of the patient. Once the control module 230 determines the module layout, the control module 230, in at least one approach, controls the robot to insert appropriate task modules into a belly of the robot, while also instructing other robots within the team to assemble with respective modules. In this way, the robot system 600 is able to dynamically configure the robot to perform a particular task that is specific to treatment of a patient, thereby improving the treatment through customization of the robot while also better utilizing the robot.

Furthermore, the control module 630 dispatches the rescue robot by initiating and directing drones to dock with the team of rescue robots and transport the robots to the location of the patient. In general, the drones are aerial drones but may also include land-based drones (e.g., four-wheel vehicles), water-based drones, and so on. The control module 630 can direct the drones to transport the team to a point close to the patient and deploy the rescue robots to begin performing therapeutic delivery according to the treatment plan. Lastly, as part of the therapeutic delivery, the control module 630 functions to control the rescue robot, including the interchangeable task modules, to provide care to the patient while coordinating actions of the other robots in the team. In this way, the robot system 600 functions to provide care in dynamic environments and improve clinical outcomes through learning and adapting responses.

Figure 7:
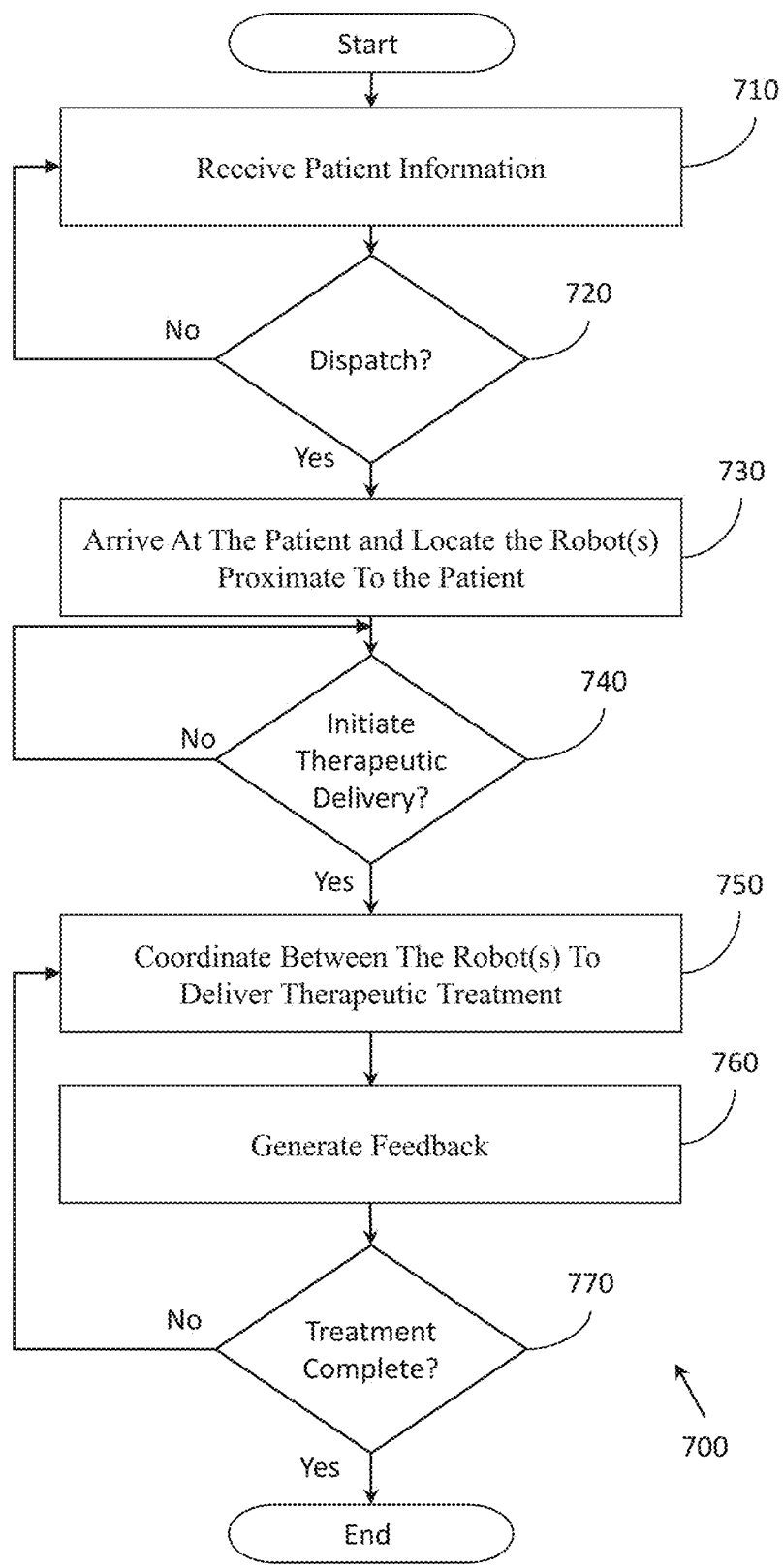
FIG. 7 is a flowchart illustrating one embodiment of a method associated with dispatching a rescue robot and performing therapeutic delivery on a patient.

Additional aspects about providing care to patients using rescue robots will be described in relation to FIG. 7. FIG. 7 illustrates a flowchart of a method 700 that is associated with dispatching rescue robots to provide onsite healthcare to patients in the field. Method 700 will be discussed from the perspective of the robot system 600 of FIG. 6 as implemented within a rescue robot, such as robot 500 of FIG. 5. While method 700 is discussed in combination with the robot system 600, it should be appreciated that the method 700 is not limited to being implemented within the robot system 600 but is instead one example of a system that may implement the method 700.

At 710, the control module 630 receives patient information. As outlined previously, the patient information 650 includes at least a location of a patient and health information about the patient that is to be treated. Of course, in further arrangements, additional information may be included with the patient information 650, such as health records for the patient, an urgency of the condition of the patient, details about the location of the patient, sensor data about the patient (e.g., vitals, etc.), and so on. In any case, the patient information 650 is generally acquired from a remote system, such as the cloud-based healthcare system 100 that processes acquired information about the patient to generate a diagnosis and the treatment plan, using, for example, a machine learning process. The system 100 can then generate the patient information 650 and communicate the patient information 650 to the rescue robot to induce the rescue robot to provide treatment to the patient. It should be appreciated that the rescue robot may repeatedly interact with the system 100 to, for example, provide updated information about the patient and receive updated treatment information in the form of adapted/new treatment plans.

At 720, the control module 630 determines whether to dispatch the rescue robot and the team. In various aspects, the function of dispatching the rescue robot may involve several different subroutines. For example, initially, the control module 630 causes the rescue robot to assemble with medical equipment (i.e., task modules/interchangeable bellies) according to the treatment plan, as explained previously. Thus, the rescue robot autonomously assembles according to the treatment plan along with the other rescue robots in the team prior to dispatching. This preparation can involve assessing the characteristics of the location to inform how to best outfit the team for treating the patient in the field. That is, the control module 630 can adjust the treatment plan to suit the location when the location would otherwise not permit the primary treatment plan. Alternatively, the control module 630 can select between equivalents that may have different characteristics that are better suited for the location. Moreover, the control module 630 can allocate medical resources to the at least one rescue robot according to available resources and an urgency of the treatment plan. Thus, the availability of different modules and the time for acquiring the modules and loading the modules into a bay of the rescue robot may further influence a selection. For example, if a particular pharmaceutical is not available or requires additional time to acquire (e.g., compound), then the control module 630 may instead use an alternative. In any case, the control module 630 develops the arrangement of task modules according to the current context and as a pre-configuration step prior to dispatching to the location.

Once configured, the control module 630 may confirm readiness with the other rescue robots in the team. Accordingly, when the team of rescue robots confirms readiness via, for example, wireless communications, then the control module 630 can initiate drone lifting in order to dispatch the team and begin transport to the location of the patient. The drones can then dock with the rescue robots and the drones travel to the location of the patient. In one approach, the control module 630 may provide information about the team and the location to the drones. The drones may then separately dock with the rescue robots and begin moving to the location. In general, the rescue robot and an associated drone may maintain communication during transport to the location of the patient.

At 730, the control module 630 determines that the drones have arrived at the location of the patient. In general, the drones place the rescue robots proximate to the patient so that the drones can quickly begin providing care. However, in various circumstances, the drones may undock the rescue robots at a greater distance from the patient due to terrain and/or other characteristics of the location.

At 740, the control module 630 determines whether the rescue robots may initiate therapeutic delivery. In general, after undocking from the drones, the rescue robots initiate coordination, as will be discussed further with method 800. Once coordinated and the robots are in position to begin, the control module 630 controls the rescue robot to perform therapeutic delivery on the patient according to the treatment plan.

At 750, the control module 630 controls the rescue robot to perform the therapeutic delivery by coordinating the therapeutic delivery between multiple rescue robots according to a control cycle. As noted, the control cycle will be discussed in greater detail with regards to FIG. 8 and method 800; however, the control cycle is, in general, a protocol for coordinating actions of multiple rescue robots to achieve a common goal of performing the treatment plan via one or more therapies. Broadly, the robot system 600 of a first rescue robot communicates with separate instances of the robot system 600 within other rescue robots to share the health information about the patient in real-time along with procedure information. The real-time health information includes observations by the rescue robots regarding a current condition of the patient as the current condition changes. Thus, one or more robots may monitor different aspects of the patient and communicate the health information to ensure the team of rescue robots remain aware of the current condition of the patient.

The procedure information includes information about the performance of the therapeutic delivery. For example, the procedure information includes progress about each separate action being performed by the separate rescue robots. Thus, the separate robots can reference this information in addition to leveraging direct observations in order to know when to perform their own actions. The control cycle generally functions in an iterative manner to at least semi-continuously update information through consistent communications broadcast among the team by the separate robots.

At 760, the control module 630 provides feedback to the cloud-based healthcare system 100 about the patient and progress of the procedure. In general, blocks 750-770 may occur in parallel such that as the therapy is being delivered and the robots are coordinating activities, the control module 630 is providing a stream of information about the process back to the system 100. The system 100 can then adapt the treatment plan in order to account for changes in the condition/diagnosis of the patient as the therapies influence the patient and as additional information is acquired that may further inform an original diagnosis. In general, the system 100 and the robot system 600 can function to independently adapt the treatment using different learning processes. That is, the respective systems can learn how to treat the patient using historical information and the feedback to actively learn how to adapt and apply the treatment plan. In this way, the knowledge of the rescue robot and the cloud-based healthcare system 100 is self-evolving via machine learning processes to improve clinical outcomes for the patient.

At 770, the control module 630 determines whether treatment is complete or not. In various approaches, the determination of whether the treatment is complete may vary. That is, depending on the condition of the patient, the treatment goal may be simply to stabilize the patient at the location and then move the patient to a hospital or other facility. In yet further examples, the treatment goal may be to provide complete treatment and release the patient. In either case, the control module 630 can make an iterative assessment against a presently defined goal and complete treatment according to this determination or proceed with further treatment. Upon completion, the drones may again dock with the rescue robots and transport the robots back to a depot or other location.

Figure 8:
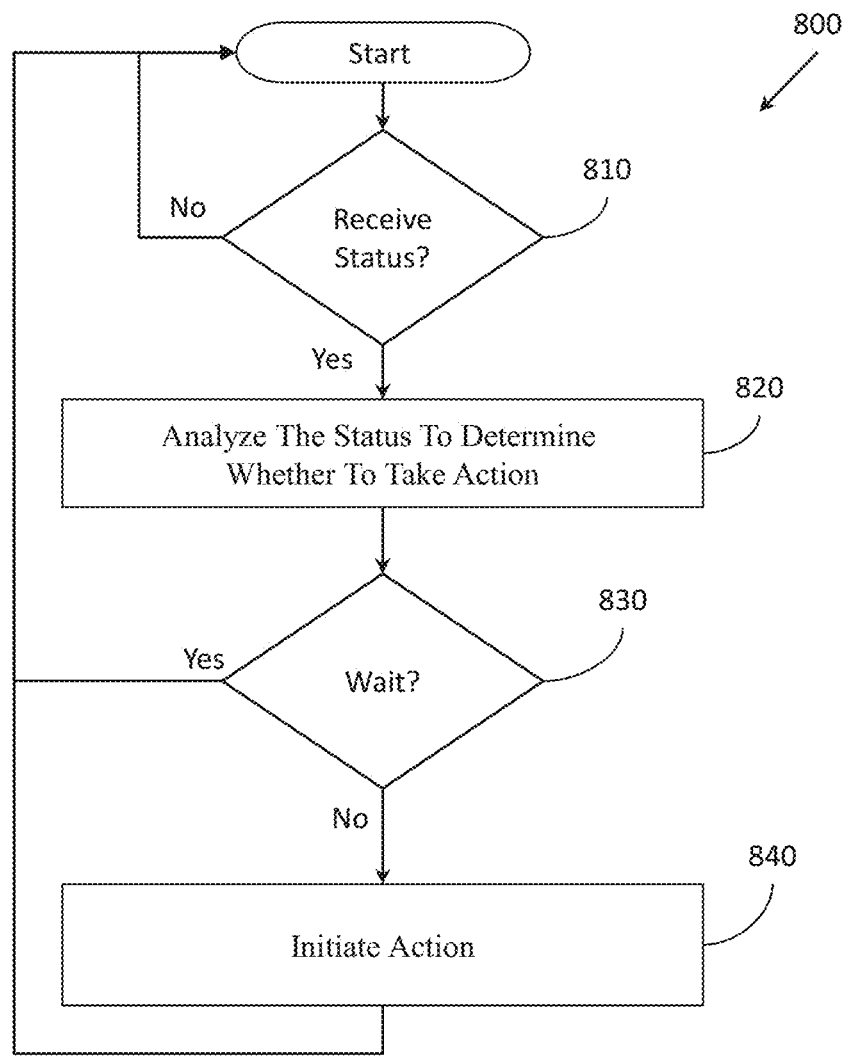
FIG. 8 is a flowchart illustrating one embodiment of a method associated with coordinating actions between robots in a team of rescue robots.

Additional aspects about coordinating activities of rescue robots will be described in relation to FIG. 8. FIG. 8 illustrates a flowchart of a method 800 that is associated with coordinating activity between multiple rescue robots to perform therapeutic delivery on a patient. Method 800 will be discussed from the perspective of the robot system 600 of FIG. 6 as implemented within a rescue robot, such as robot 500 of FIG. 5. While method 800 is discussed in combination with the robot system 600, it should be appreciated that the method 800 is not limited to being implemented within the robot system 600 but is instead one example of a system that may implement the method 800.

At 810, the control module 630 receives status information from other rescue robots that are waiting to perform an action or an in the process of performing an action. The status information can also include updates about the patient, such as updates to health information, updates to treatment plans, and so on. In general, any information that can influence actions of the rescue robot can be conveyed as part of a status update once the treatment process has been initiated.

At 820, the control module 630 analyzes the status to determine whether to take action or not. In general, the determination of whether the control module 630 controls the rescue robot to take an action depends on a queued action of the rescue robot and whether the status indicates that the action is presently appropriate. For example, if there is a sequence of steps in a particular procedure and the rescue robot is waiting for a specific assigned step, then the control module 630 determines to wait until the sequence reaches the action. In further aspects, the determination can depend on changes in a condition of the patient. For example, if the rescue robot is to provide external defibrillator functions, then the control module 630 waits until identifying a signature in the vitals of the patient that warrants action while also, for example, ensuring the patient is clear of other people and sensitive instruments. Thus, the control module 630 is analyzing the available data acquired both via communications with other rescue robots and via direct observations to determine when to take action when delivering a therapy.

At 830, if the determination at 820 is that no action is to be taken, then the rescue robot waits and proceeds to iterate the process of analyzing subsequent status updates. Otherwise, the control module 630 proceeds to initiate an action as discussed with block 840.

At 840, the control module 630 selectively initiates a next action as part of the therapeutic delivery according to the current status, including current activities of additional robots and the current condition of the patient. Thus, the control module 630 performs the therapeutic delivery in an automated manner by observing and coordinating actions with other rescue robots. In this way, multiple robots can function together to implement a treatment plan and care for a patient in the field at a location of the patient.

Figure 9:
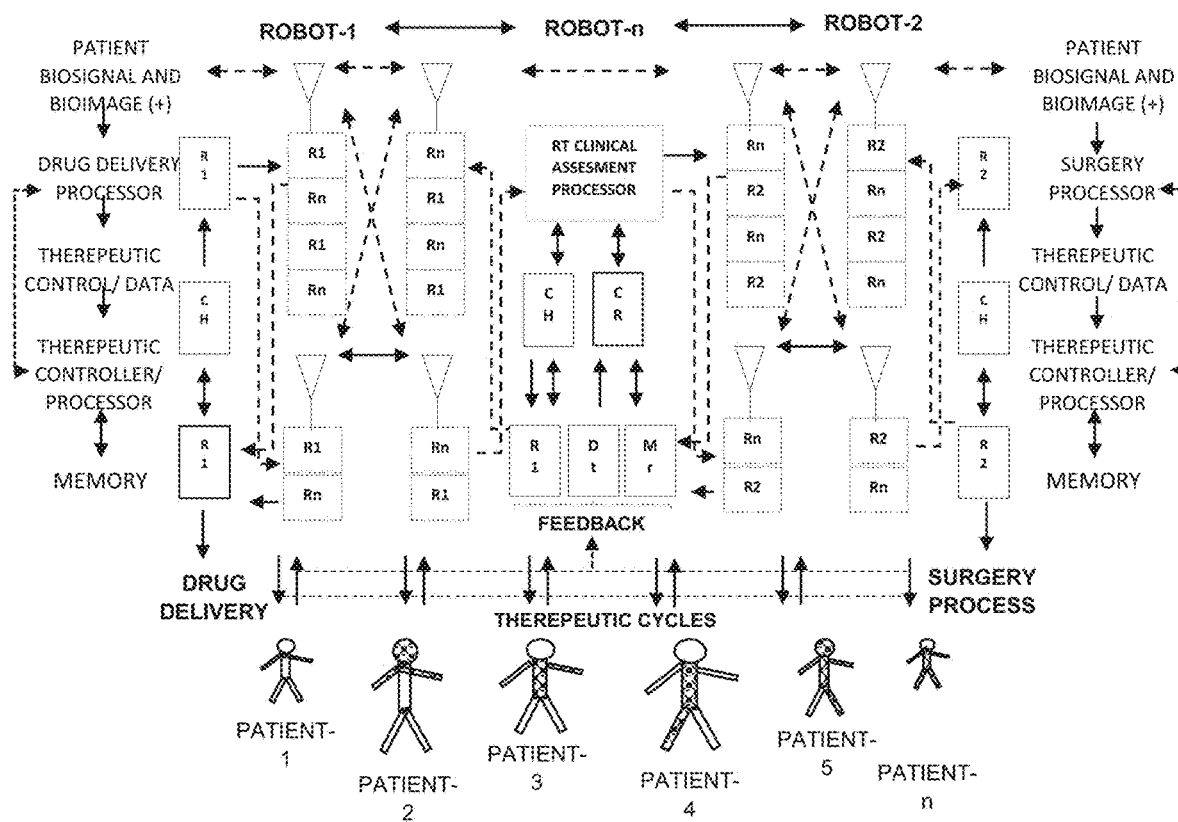
FIG. 9 is a diagram illustrating an example of rescue robots involved in robotics coordination, cooperation, and collaboration of therapeutic treatments for burn injuries in a mass casualty incident.

FIG. 9 is an example of robot-to-robot (Robot 1-to Robot n) and robot-to-robots (robot n to robot 1 and robot 2) coordination, cooperation, and collaboration for therapeutic treatments. Consider an example of a mass casualty event (e.g., mass disaster, terrorist) in which approximately 25 to 30 percent of those injured sustain a moderate-to-severe burn injury. Generally, a limited number of individuals are impacted in typical civilian accidents that result in burn injury (e.g., house fires). By contrast, the magnitude and impact of burns associated with a mass disaster can be devastating, affecting many individuals simultaneously and often exceeding the capacity (i.e., beds, surgeons, nurses, operating rooms, equipment, supplies, etc.) of available local burn centers to provide optimal burn care. With a rescue robot team, well-equipped multifunctional robots can handle surge capacity that is, as one example, up to 90 percent of a typical maximum capacity along with providing faster responses that save lives. Just a five-minute delay, from 7 minutes to 12 minutes, can result in the odds of death increasing by 46 percent.

With further reference to FIG. 9, as a further aspect, Robot n (Rn) may function in relation to triage of burn patients in mass disasters and can be outfitted and programmed to treat adults and children with >20 percent total body surface area (TBSA) burns immediately. The care of severely burned patients can be provided by dedicated rescue team robots that perform surgical grafting support, ICU care, and rehabilitative care, including improved resuscitation, enhanced wound coverage, infection control, and management of inhalation injuries. In addition to percentage TB SA burnt victims, in mass disasters, the presence of inhalation injury, other severe injuries, and wide variations in patient ages are also incorporated into autonomous robotic triage and patient dispositions.

Further, consider implementation of Robot n (Rn) for a circumstance of combined burn and trauma. For combined burn/trauma patients, an understanding of the independent temporal changes of each injury (eg, penetrating, blunt, burn) and how they interact with each other allows the rescue robot that is implementing screening and recognition functions to devise an optimal management strategy for caring for the patient. The highest priority (after airway, breathing, and intravenous access) in the setting of combined burn/trauma is the assessment and treatment of immediately life-threatening injuries, whether penetrating or blunt, followed by the management of the burn. The key to the initial management of a combined burn/trauma patient is that the presence of burn wounds should not interfere with basic resuscitation and stabilization. As an example, the presence of burned skin should not preclude attempts at intravenous access, control of hemorrhaging sites, coverage of open fractures and wounds, and fixation of closed fractures.

Accordingly, Robot n (Rn), Robot 1 (R1) and Robot 2 (R2) perform coordination, cooperation, and collaboration to manage care of burn patients who require mechanical ventilation (eg, inhalation injury, massive fluid resuscitation), require cardiac or other hemodynamic monitoring to guide fluid therapy or monitoring, or have risk factors for multisystem organ failure. Robot n (Rn) represents a first multifunction robot (e.g., for performing medical screening and recognition) in communication with a second multifunction robot-1 (R1) (e.g., for performing pharmaceutical delivery), and robot-n may also be in communication with a surgical care robot (R2) via V2V, V2X, or another communication standard. The robot-n, in one arrangement, may comprise a transmitting part communicating with a receiving robot-2 that provides surgical care and robot-1 that provides pharmaceutical care. The communication may be based on sidelink or another communication standard. The transmitting robot-n may comprise a UE, an RSU, etc. The receiving device may comprise a UE, an RSU, etc. As a note about device configuration, the robots may include a therapeutic controller/processor that implements layer 3 and layer 2 communication functionality. In one approach, layer 3 includes a radio resource control layer, and layer 2 includes a robotic data convergence protocol layer, a radio link control layer, and a medium access control layer.

Each transmitter of the robot Rn may modulate an RF carrier with a respective spatial stream for transmission. As a further aspect, in regards to the robot R2, each receiver R1 and R2 receives a signal through its respective antenna. Each receiver R1 and R2 recovers information modulated onto an RF carrier and provides the information to the receive R1 and R2 processor. The Rn processor and the R1 and R2 processor implement layer 1 functionality associated with various signal processing functions. The R1 and R2 processor may perform spatial processing on the information to recover any spatial streams destined for the robot-2 surgical care. If multiple spatial streams are destined for the robot-2 that provides surgical care, they may be combined by the R2 processor. Soft decisions are then decoded and deinterleaved to recover the data and control signals that were originally transmitted by Rn (real-time clinical assessment and/or clinical outcomes) on the physical channel. The data and control signals are then provided to the therapeutic controller/processor, which implements layer 3 and layer 2 functionality.

Each receiver R1 and R2 receives a signal through its respective antenna. Each receiver R1 and R2 recovers information modulated onto an RF carrier and provides the information to an Rn processor. The therapeutic controller/processor can be associated with a memory (m) that stores program codes and data. The memory (M) may be referred to as a computer-readable medium. The therapeutic controller/processor provides demultiplexing between transport and logical channels, packet reassembly, deciphering, header decompression, control signal processing. The therapeutic controller/processor is also responsible for error detection using an ACK and/or NACK protocol to support HARQ operations. At least one of the Rn processors, R1 processor, and R2 processor, or the therapeutic controller/processor of robot-1 pharmaceutical care robot or robot-2 surgical care robot, the Rn processor, or the therapeutic controller/processor may be configured to perform aspects described in connection with the rescue team robots.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, Python, or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A robot system for automated healthcare for patients in distributed locations, comprising:
   one or more processors; and
   a memory communicably coupled to the one or more processors and storing instructions that, when executed by the one or more processors, cause the one or more processors to:
   receive patient information, including at least a location of a patient and health information about the patient that is to be treated from a robotic device located proximate to the patient that autonomously interacts with the patient to collect the patient information, the robotic device being a multifunction robot;
   dispatch at least one rescue robot to the location that will treat the patient according to a treatment plan derived from the health information, including provisioning the rescue robot with medical resources that the rescue robot assembles based on the treatment plan; and
   responsive to the at least one rescue robot arriving at the patient, perform, by the at least one rescue robot, therapeutic delivery on the patient according to the treatment plan as identified by the health information,
   wherein the instructions to perform the therapeutic delivery include instructions to adapt the treatment plan and how the treatment plan is applied according to a self-evolving process that identifies the efficacy of the treatment plan and adapts a machine-learning algorithm to improve treatment of the patient.

2. The robot system of claim 1, wherein the instructions to dispatch include instructions to cause the at least one rescue robot to assemble with medical equipment according to the treatment plan, the at least one rescue robot being a multifunction robot with bays for interchangeable modules that the at least one rescue robot autonomously assembles according to the treatment plan.

3. The robot system of claim 1, wherein the instructions to dispatch the at least one rescue robot cause the at least one rescue robot to dock with an aerial drone and travel to the location of the patient, and
   wherein the instructions to dispatch include instructions to allocate the medical resources to the at least one rescue robot according to available resources and an urgency of the treatment plan.

4. The robot system of claim 1, wherein the instructions to perform the therapeutic delivery include instructions to coordinate the therapeutic delivery between multiple rescue robots according to a control cycle, and
   wherein the multiple rescue robots communicate using wireless communications to share the health information about the patient and procedure information about performance of the therapeutic delivery that are at least semi-continuously updated.

5. The robot system of claim 4, wherein the instructions to perform the therapeutic delivery according to the control cycle between the multiple rescue robots include instructions to selectively initiate a next action as part of the therapeutic delivery by at least one of the multiple rescue robots according to current activities of additional robots of the multiple rescue robots, and
   wherein the instructions to perform the therapeutic delivery includes at least semi-autonomously performing the therapeutic delivery by the multiple rescue robots including the at least one rescue robot.

6. The robot system of claim 4, wherein the instructions to coordinate the therapeutic delivery include instructions to automatically coordinate the multiple rescue robots to accomplish the treatment plan and iteratively update the treatment plan as a condition of the patient changes.

7. The robot system of claim 4, wherein the instructions to perform the therapeutic delivery include the instructions to adapt the treatment plan and therapeutic delivery using a machine learning process according to feedback about the patient as observed by one or more of the multiple rescue robots, and
   wherein the instructions to adapt include instructions to learn how to treat the patient using historical information and the feedback to actively learn how to adapt and apply the treatment plan.

8. The robot system of claim 1, wherein the instructions to receive the patient information further include instructions to acquire sensor data about the patient that is processed via a remote system to diagnose the patient and determine the treatment plan via a machine learning process.

9. A non-transitory computer-readable medium for automated healthcare for patients in distributed locations and storing instructions that, when executed by one or more processors, cause the one or more processors to:
receive patient information, including at least a location of a patient and health information about the patient that is to be treated from a robotic device located proximate to the patient that autonomously interacts with the patient to collect the patient information, the robotic device being a multifunction robot;
dispatch at least one rescue robot to the location that will treat the patient according to a treatment plan derived from the health information, including provisioning the rescue robot with medical resources that the rescue robot assembles based on the treatment plan; and
responsive to the at least one rescue robot arriving at the patient, perform, by the at least one rescue robot, therapeutic delivery on the patient according to the treatment plan as identified by the health information,
wherein the instructions to perform the therapeutic delivery include instructions to adapt the treatment plan and how the treatment plan is applied according to a self-evolving process that identifies the efficacy of the treatment plan and adapts a machine-learning algorithm to improve treatment of the patient.

10. The non-transitory computer-readable medium of claim 9, wherein the instructions to dispatch include instructions to cause the at least one rescue robot to assemble with medical equipment according to the treatment plan, the at least one rescue robot being a multifunction robot with bays for interchangeable modules that the at least one rescue robot autonomously assembles according to the treatment plan.

11. The non-transitory computer-readable medium of claim 9, wherein the instructions to dispatch the at least one rescue robot cause the at least one rescue robot to dock with an aerial drone and travel to the location of the patient, and
wherein the instructions to dispatch include instructions to allocate the medical resources to the at least one rescue robot according to available resources and an urgency of the treatment plan.

12. The non-transitory computer-readable medium of claim 9, wherein the instructions to perform the therapeutic delivery include instructions to coordinate the therapeutic delivery between multiple rescue robots according to a control cycle, and
wherein the multiple rescue robots communicate using wireless communications to share the health information about the patient and procedure information about performance of the therapeutic delivery that are at least semi-continuously updated.

13. The non-transitory computer-readable medium of claim 12, wherein the instructions to perform the therapeutic delivery according to the control cycle between the multiple rescue robots include instructions to selectively initiate a next action as part of the therapeutic delivery by at least one of the multiple rescue robots according to current activities of additional robots of the multiple rescue robots, and
wherein the instructions to perform the therapeutic delivery includes at least semi-autonomously performing the therapeutic delivery by the multiple rescue robots including the at least one rescue robot.

14. A method for automated healthcare for patients in distributed locations, comprising:
receiving patient information, including at least a location of a patient and health information about the patient that is to be treated from a robotic device located proximate to the patient that autonomously interacts with the patient to collect the patient information, the robotic device being a multifunction robot;
dispatching at least one rescue robot to the location that will treat the patient according to a treatment plan derived from the health information, including provisioning the rescue robot with medical resources that the rescue robot assembles based on the treatment plan; and
responsive to the at least one rescue robot arriving at the patient, performing, by the at least one rescue robot, therapeutic delivery on the patient according to the treatment plan as identified by the health information,
wherein performing the therapeutic delivery includes adapting the treatment plan and how the treatment plan is applied according to a self-evolving process that identifies the efficacy of the treatment plan and adapts a machine-learning algorithm to improve treatment of the patient.

15. The method of claim 14, wherein dispatching includes causing the at least one rescue robot to autonomously assemble itself with medical equipment according to the treatment plan, the at least one rescue robot being a multifunction robot with bays for interchangeable modules that the at least one rescue robot autonomously assembles according to the treatment plan.

16. The method of claim 14, wherein dispatching the at least one rescue robot causes the at least one rescue robot to dock with an aerial drone and travel to the location of the patient, and
wherein dispatching includes allocating the medical resources to the at least one rescue robot according to available resources and an urgency of the treatment plan.

17. The method of claim 14, wherein performing the therapeutic delivery includes coordinating the therapeutic delivery between multiple rescue robots according to a control cycle that is a protocol for controlling communication between the multiple rescue robots to coordinate actions associated with the treatment plan, and
wherein the multiple rescue robots communicate using wireless communications to share the health information about the patient and procedure information about performance of the therapeutic delivery that are at least semi-continuously updated.

18. The method of claim 17, wherein performing the therapeutic delivery according to the control cycle between the multiple rescue robots includes:
selectively initiating a next action as part of the therapeutic delivery by at least one of the multiple rescue robots according to current activities of additional robots of the multiple rescue robots, wherein performing the therapeutic delivery includes at least semi-autonomously performing the therapeutic delivery by the multiple rescue robots including the at least one rescue robot,
wherein coordinating the therapeutic delivery includes automatically coordinating the multiple rescue robots to accomplish the treatment plan and iteratively update the treatment plan as a condition of the patient changes.

19. The method of claim 17, wherein performing the therapeutic delivery includes adapting the treatment plan and therapeutic delivery using a machine learning process according to feedback about the patient as observed by one or more of the multiple rescue robots, and
wherein adapting includes learning how to treat the patient using historical information associated with historical patients and the feedback about the patient to actively learn how to treat the patient via dynamically adapting and applying the treatment plan in real-time.

20. The method of claim 14, wherein receiving the patient information further includes:

acquiring sensor data about the patient that is processed via a remote system to diagnose the patient and determine the treatment plan via a machine learning process.

* * * * *